United States Patent
Ross et al.

(10) Patent No.: US 10,901,751 B2
(45) Date of Patent: Jan. 26, 2021

(54) TEMPORAL LAYERS FOR CONTAINER TECHNOLOGIES

(71) Applicant: INTERNATIONAL BUSINESS MACHINES CORPORATION, Armonk, NY (US)

(72) Inventors: Martin A. Ross, Gosport (GB); Jack Evans, Rochester (GB); Robert M. Convery, Chandlers Ford (GB); Dominic J. Storey, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

(21) Appl. No.: 15/982,128

(22) Filed: May 17, 2018

(65) Prior Publication Data

US 2019/0354382 A1 Nov. 21, 2019

(51) Int. Cl.
*G06F 9/455* (2018.01)
*G06F 9/445* (2018.01)
*G06F 8/61* (2018.01)

(52) U.S. Cl.
CPC ............ *G06F 9/44505* (2013.01); *G06F 8/63* (2013.01); *G06F 9/45558* (2013.01); *G06F 2009/45562* (2013.01)

(58) Field of Classification Search
CPC .................................................. G06F 9/44505
USPC ............................................................ 718/1
See application file for complete search history.

(56) References Cited

U.S. PATENT DOCUMENTS

| | | |
|---|---|---|
| 9,116,768 B1 | 8/2015 | Sawhney et al. |
| 2017/0034023 A1* | 2/2017 | Nickolov ............ H04L 43/0817 |
| 2017/0052772 A1 | 2/2017 | Chen et al. |
| 2017/0093923 A1 | 3/2017 | Duan |
| 2017/0116415 A1 | 4/2017 | Stopel et al. |
| 2017/0300311 A1 | 10/2017 | Vasquez et al. |
| 2018/0196654 A1* | 7/2018 | Bo ......................... G06F 9/455 |

OTHER PUBLICATIONS

Cambell, "Refactoring a Dockerfile for image size," https://blog.replicated.com/2016/02/05/refactoring-a-dockerfile-for-Image-size, Feb. 5, 2016; 8 pages.

"Removing What Was Added In Previous Layer In Docker" http://stackoverflow.com/questions/26612498/removing-what-was-added-in-previous-layer-in-docker, Stackoverflow, accessed May 9, 2018; 2 pages.

(Continued)

*Primary Examiner* — Timothy A Mudrick
(74) *Attorney, Agent, or Firm* — Scott Dobson; Andrew D. Wright; Roberts Calderon Safran & Cole, P.C.

(57) ABSTRACT

Systems and methods for building images used in software containers are disclosed. A computer-implemented method includes: receiving, at a host computer, plural commands defined in a build file; determining, by the host computer, one of the plural commands is indicated as a temporal layer; building, by the host computer, an image including respective layers corresponding to respective ones of the plural commands; deleting from the image, by the host computer, one of the respective layers corresponding to the one of the plural commands indicated as the temporal layer; and pushing, by the host computer, the image to a registry.

20 Claims, 6 Drawing Sheets

(56) References Cited

OTHER PUBLICATIONS

Docker (software), https://en.wikipedia.org/wiki/Docker_(software), Wikipedia, accessed May 9, 2018; 8 pages.
"Container Security", THALES, https://www.thalesesecurity.com/use-case/data-security-and-encryption/container-security, accessed Nov. 30, 2017; 6 pages.
Giannakopoulos et al., "Isolation in Docker through Layer Encryption", 2017 IEEE 37th International Conference on Distributed Computing Systems (ICDCS), 2017; 3 pages.
"Manage Sensitive Data with Docker Secrets", Docker Documentation, https://docs.docker.com/engine/swarm/secrets/, accessed Nov. 30, 2017; 22 pages.
"Docker Overview", Docker Documentation, https://docs.docker.com/engine/docker-overview/, accessed Mar. 19, 2018; 7 pages.
"What is a Container", Docker Documentation, https://docs.docker.com/engine/docker-overview/, accessed May 10, 2018; 8 pages.
Fulay, "Understanding Docker Images and Layers", https://adeeshfulay.wordpress.com/2017/09/08/understanding-docker-images-and-layers/, Sep. 8, 2017; 6 pages.
Jessica G, "Digging into Docker Layers", https://medium.com/@jessgreb01/digging-into-docker-layers-c22f948ed612, Nov. 13, 2016; 8 pages.
Ellingwood, "The Docker Ecosystem: An Introduction to Common Components", https://www.digitalocean.com/community/tutorials/the-docker-ecosystem-an-introduction-to-common-components, Feb. 1, 2015; 11 pages.

\* cited by examiner

101' → RUN (LIFETIME 30s) npm config set registry $NPM_REGISTRY_URL && npm config set _auth $NPM_AUTH && \ npm config set email $NPM_USER && npm config set always-auth true && \

102' → COPY app/ /opt/abc/

103' → WORKDIR /opt/abc/app/

104' → RUN npm install

101'' → RUN (LIFETIME UNTIL ID:npm) npm config set registry $NPM_REGISTRY_URL && npm config set _auth $NPM_AUTH && \ npm config set email $NPM_USER && npm config set always-auth true && \

102'' → COPY app/ /opt/abc/

103'' → WORKDIR /opt/abc/app/         202

104'' → RUN (ID:npm) npm install

101'' → RUN (LIFETIME UNTIL ID:npm) npm config set registry
$NPM_REGISTRY_URL && npm config set _auth $NPM_AUTH &&
\ npm config set email $NPM_USER && npm config set always-auth
true && \

102'' → COPY app/ /opt/abc/

103'' → WORKDIR /opt/abc/app/

104'' → RUN (ID:npm) npm install

105'' → RUN npm test

106'' → COPY app2/ /opt/abc/

TEMPORAL LAYERS FOR CONTAINER TECHNOLOGIES

BACKGROUND

The present invention relates generally to software containers and, more specifically, to protecting sensitive information used in creating software containers.

A container is a stand-alone executable package of a piece of software that includes everything needed to run it, including application code, runtime, system tools, system libraries, and settings. Containers are lightweight and constructed from layered file systems, e.g., sharing common files, making disk usage and image downloads efficient. A container can run in various environments including but not limited to a local computing device (e.g., a desktop or a laptop), physical or virtual machines in a data center, and cloud providers.

Containers provide lightweight virtualization that allows for isolating processes and/or resources without the need of providing instruction interpretation mechanisms and/or other complexities of full virtualization. Container technology, such as Linux Container (LXC), provides lightweight virtualization that allows isolating processes and resources without the need to provide instruction interpretation mechanisms and other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries. As such, plural containers can run simultaneously on a same computer device, each sharing the same OS kernel of the computer device and each running as an isolated process in user space.

Containers differ from virtual machines (VMs) in the sense that VMs are an abstraction of physical hardware effectively turning one server into plural servers, with a hypervisor controlling the plural VMs running on a single machine. Each VM includes a full copy of an OS, one or more applications, and any necessary binaries and libraries. Containers typically take up less storage space than VMs and start (e.g., boot) faster than VMs.

Containers are based on images that are published to a registry. Images include plural layers, with each layer being made up of a file that is generated from running a command of a build file. Information contained in the various layers of an image is accessible (e.g., viewable) by a user that obtains the image from the registry.

SUMMARY

In an aspect of the invention, a computer-implemented method includes: receiving, at a host computer, plural commands defined in a build file; determining, by the host computer, one of the plural commands is indicated as a temporal layer; building, by the host computer, an image including respective layers corresponding to respective ones of the plural commands; deleting from the image, by the host computer, one of the respective layers corresponding to the one of the plural commands indicated as the temporal layer; and pushing, by the host computer, the image to a registry.

In another aspect of the invention, there is a computer program product comprising a computer readable storage medium having program instructions embodied therewith. The program instructions are executable by a host computing device to cause the host computing device to: receive, from a client computing device, plural commands defined in a build file; recognize syntax in one of the plural commands defining the one of the plural commands as a temporal layer; build an image including respective layers corresponding to respective ones of the plural commands, wherein at least one of the layers is created using sensitive information contained in the temporal layer; and push the image to a registry, wherein the image is devoid of the temporal layer when the image is pushed to the registry.

In another aspect of the invention, there is a system for building images used in software containers. The system includes a CPU, a computer readable memory and a computer readable storage medium associated with a computing device; program instructions to receive, from a client computing device, plural commands defined in a build file; program instructions to recognize syntax in one of the plural commands defining the one of the plural commands as a temporal layer; program instructions to build an image including respective layers corresponding to respective ones of the plural commands, wherein at least one of the layers is created using sensitive information contained in the temporal layer; and program instructions to delete the temporal layer from the image prior to pushing the image to a registry. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to software containers and, more specifically, to protecting sensitive information used in creating software containers. Aspects of the invention are directed to a new syntax in a container build language that triggers immediate squashing (e.g., removing of the history of files) in the middle of a build such that subsequent programs that run the build cannot access the history and sensitive information in the history is removed as soon as possible. Aspects of the invention are directed to a new syntax in a container build language that causes certain layers to be transient and, thus, to exist only for a predefined period of time or until a predefined build step has been executed. This enables a specified layer of an image to be in existence only while required during a build, ensuring that sensitive information used to build the image is not included in the image that is stored in a registry. In this manner, sensitive information included in a temporal layer that is used in building an image is not included in the image that is published to the registry, such that downstream users of the image cannot access (e.g., view) the sensitive information. Implementations of the invention provide advantages of improved security of sensitive information in containerization technologies and reduced resource requirements for images.

In one embodiment, a temporal layer is used by the build engine during the building of the image from a build file, and the temporal layer is deleted from the image before the image is published to a registry. In this embodiment, a new syntax in the container build language triggers immediate squashing (e.g., removing of the history of files) in the middle of a build such that subsequent programs that run the build cannot access the history and sensitive information in the history is removed as soon as possible. In another embodiment, a new syntax in the container build language causes creation of a main image and a fork image when building an image from a build file. The temporal layer is in the fork image but not the main image. Information in the temporal layer is used to create another layer in the main image, and the main image is ultimately published to the registry. In both embodiments, the temporal layer (and the sensitive information contained in the temporal layer) is not included in the final image that is published to the registry.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
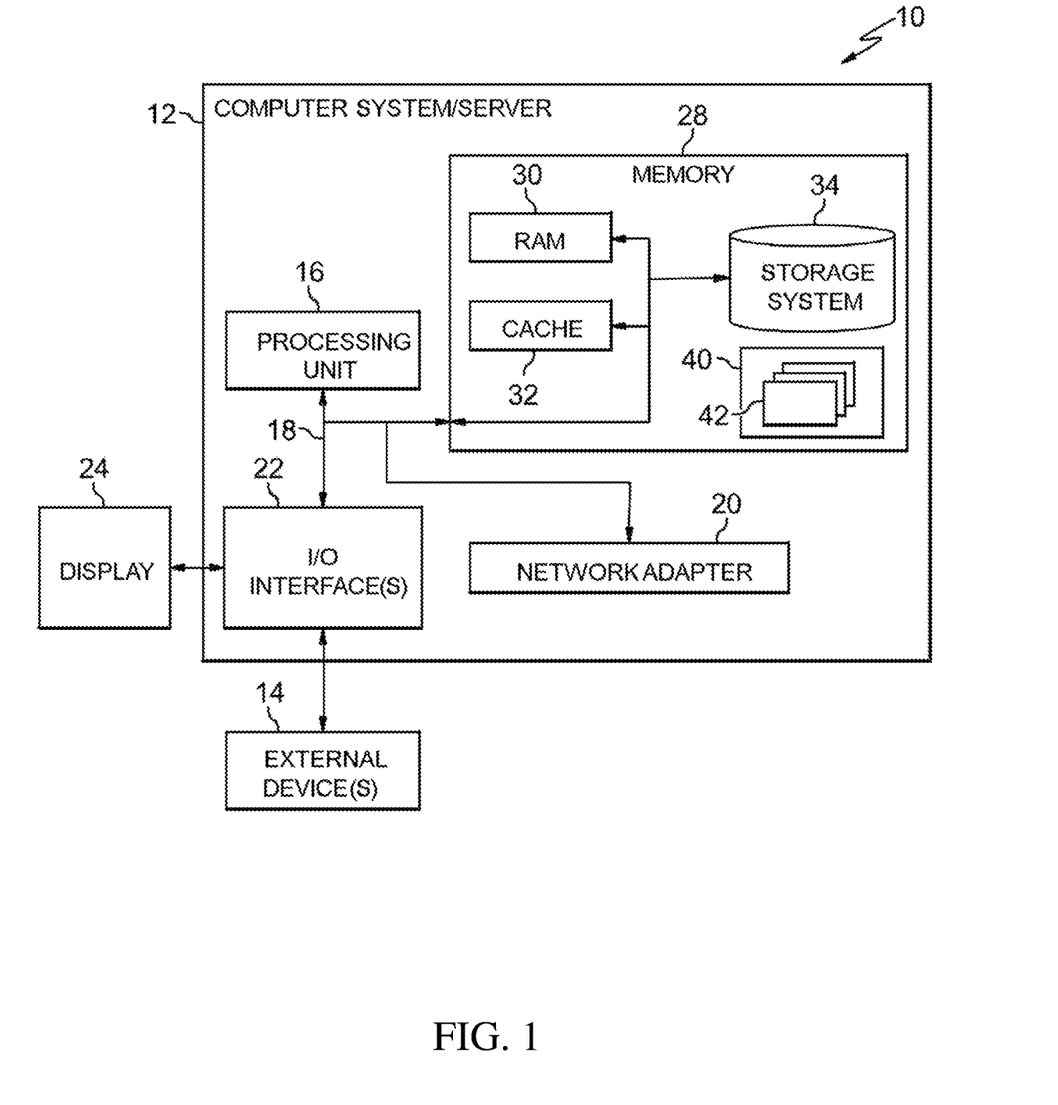
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
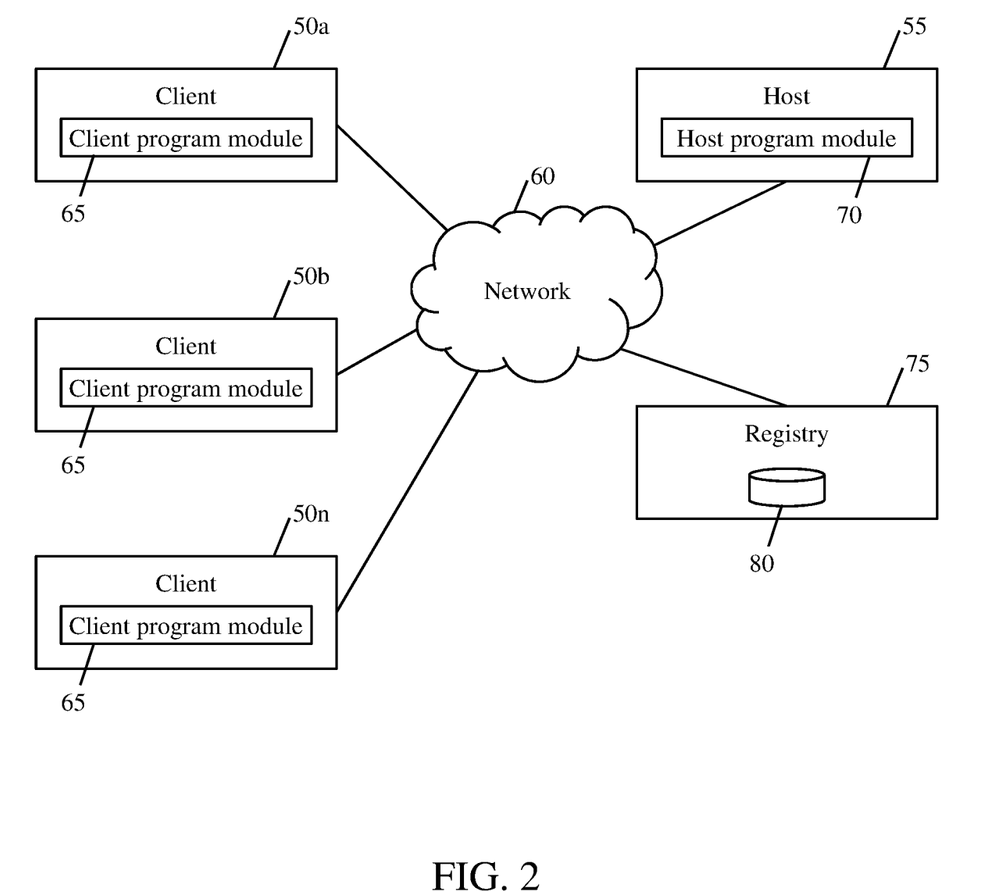
FIG. 2 shows an exemplary environment in accordance with aspects of the invention.

FIG. 2 shows an exemplary environment in accordance with aspects of the invention. Embodiments of the invention are described herein with reference to "Docker" and commands used therein. Docker is an open-source project that automates the deployment of applications inside software containers by providing an additional layer of abstraction and automation of operating-system-level virtualization on Linux. (Note: the term(s) "Docker" and "Linux" may be subject to trademark rights in various jurisdictions throughout the world and are used here only in reference to the products or services properly denominated by the marks to the extent that such trademark rights may exist.) Certain terms used herein have an understood meaning within the context of Docker specifically and containerization generally. For example, an image is a collection of layers and constitutes a read-only template with instructions for creating a container. A build file is used to create an image, with each instruction in the build file creating a layer in the image. A container is a runnable instance of an image, i.e., an encapsulated environment that runs an application contained in the image. Although aspects of the invention are described with respect to Docker, it is understood that implementations of the invention are not limited to use with Docker and may be used with other containerization programs.

As depicted in FIG. 2, a number of clients 50a-n are in communication with a host 55 via a network 60. Each client 50a-n may comprise a computer device, such as a laptop computer, tablet computer, desktop computer, etc., that includes one or more elements of computer system 12 of FIG. 1. Each client 50a-n may include a client program module 65, which may comprise one or more program modules 42 described with respect to FIG. 1. In embodiments, the client program module 65 is configured to cause a client device to communicate with the host 55 to perform containerization functions including but not limited to building an image, pulling an image from a registry, pushing an image to a registry, running an image, etc. In embodiments, the client program module 65 sends commands to the host 55 using application programming interfaces (APIs). For example, the client program module 65 may communicate with the host 55 using one or more Docker REST APIs over UNIX sockets or a network interface.

The network 60 may comprise any suitable computer network or combination of networks. For example, the network 60 may comprise one or more of a LAN, WAN, and the Internet.

The host 55 may comprise a computer device, such as a server, that includes one or more elements of computer system 12 of FIG. 1. The host 55 includes a host program module 70, which may comprise one or more program modules 42 described with respect to FIG. 1. In embodiments, the host program module 70 is configured to manage aspects of the containerization system including but not limited to managing images, containers, networks, and volumes. For example, the host program module 70 may be configured to listen for a command (e.g., API requests) from the client program module 65, and to perform a function (e.g., build an image, store an image, retrieve an image, etc.) in response to the command. In embodiments, the host program module 70 includes a build engine that is configured to create an image a build file supplied by a client program module 65.

The registry 75 is a repository for images. The registry 75 may comprise a computer device that includes one or more elements of computer system 12 of FIG. 1, such as a storage system 34. Clients may employ the host to upload (e.g., push) images that they have built to the registry 75. Subsequently, clients may employ the host to download (e.g., pull) images from the registry 75 to use applications defined in the images. This architecture permits users to access and utilize applications that have been created and stored by others. For example, a user may use a client device to obtain an image containing an application from the registry 75, and use the obtained image to deploy the application into the user's testing, staging, and/or production environments. The user may subsequently update the application by pulling a new version of the image (from the registry 75) and redeploying the container(s).

Figure 3:
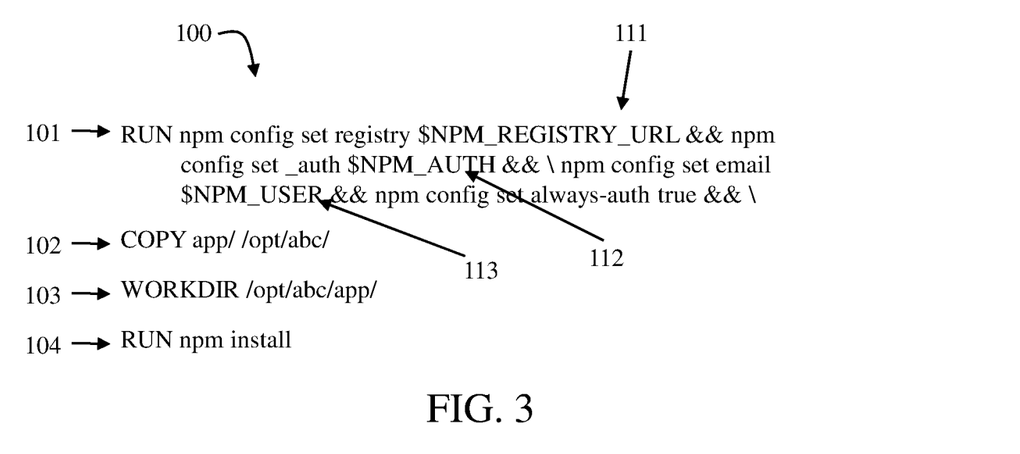
FIG. 3 shows an example of a build file.

FIG. 3 shows an example of a build file 100 that is generated (e.g., written by a user) at the client program module 65. The client program module 65 may transmit the entire build file 100, or individual commands of the build file 100, to the host program module 70. The build engine of the host program module 70 may use the commands of the build file 100 to build an image that is saved in the registry 75. The image may be used to create a container that contains an application, and the container may be used to run the application on a client device.

In this example, the build file 100 includes a first command 101, a second command 102, a third command 103, and a fourth command 104. The first command 101 is supplied three build arguments 111, 112, 113 that contain sensitive information. In this example, the sensitive information includes a URL (at argument 111) and a username (at argument 113) and password (at argument 112) to access the URL. The first command 101 of the build file 100 instructs the build engine to set up a Node Package Manager (npm) configuration so that it can use the sensitive information (e.g., URL, username, and password) to pull modules from the internal npm registry. The second command 102 causes the build engine to copy application code (e.g., Node.js application code) from the registry, and the third command 103 and fourth command 104 install the required modules. In this example, the sensitive information is used to access a registry for copying application code that is written into the image. A container is instantiated when the image is run, and the container may be used to run the application on a client device. In this manner, the sensitive information is used to build the image, but is not used when the application is run on a client device.

Figure 4:
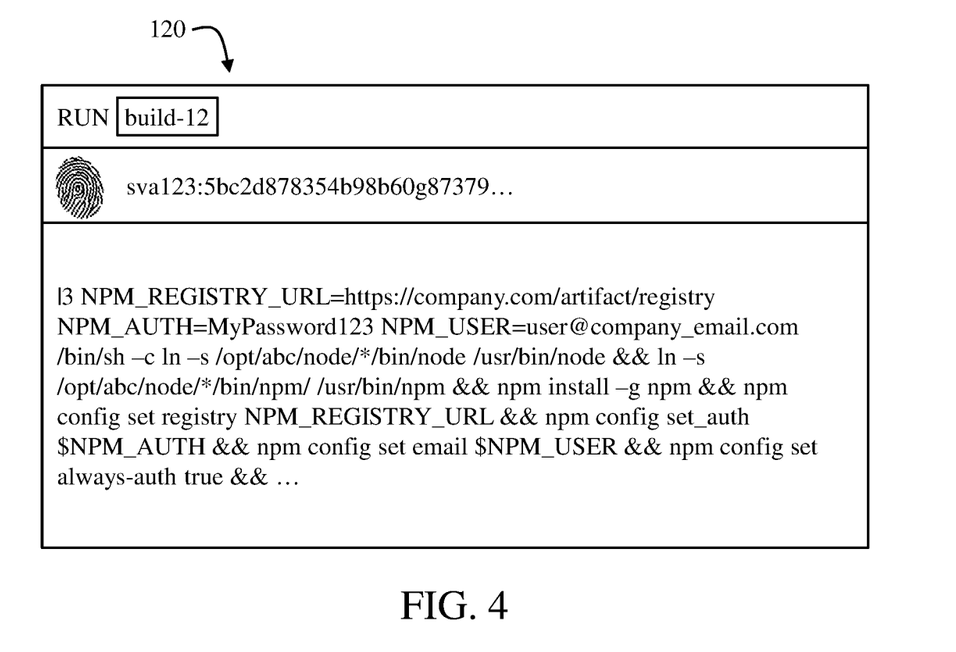
FIG. 4 shows an example of a layer that is created from the build file of FIG. 3.

FIG. 4 shows a layer 120 of an image that is built using the build file 100 of FIG. 3. As illustrated in FIG. 4, the sensitive information is contained in the layer 120. In particular, the URL (https://mb.artfact.swg-devs.com/artfact/api/npm/connect-npm), username (user@company_email.com), and password (MyPassword123) supplied by the first command 101 of the build file 100 are saved in the layer 120. The information included in the layer 120 is accessible (e.g., viewable) by other users that obtain the image from the registry 75. This poses an information security risk because sensitive information (e.g., a URL and a username and password used to access the URL) is visible to other users that access the image after the image is saved in the registry 75.

Implementations of the invention eliminate this information security risk by modifying the build engine of the host program module 70 to permit a user (using the client program module 65) to specify that a layer only exists for a temporary amount of time, such that the layer (and thus the sensitive information included in the layer) is not included in the image that is stored in the registry 75. In this manner, the sensitive information may still be used to build the image, but is not included in the image that is stored in the registry 75 and, thus, is not visible to other users who access the image from the registry 75.

In embodiments, the build engine is modified to accept a new syntax that defines a temporal aspect of a command of a build file. In a first embodiment, illustrated in FIG. 5A, the build engine is modified to accept a new syntax 201 that defines an amount of time that a layer exists before being deleted from the image. In a second embodiment, illustrated in FIG. 5B, the build engine is modified to accept a new syntax 202 that defines a subsequent step that triggers automatic deletion of a layer from the image.

Figure 5A:
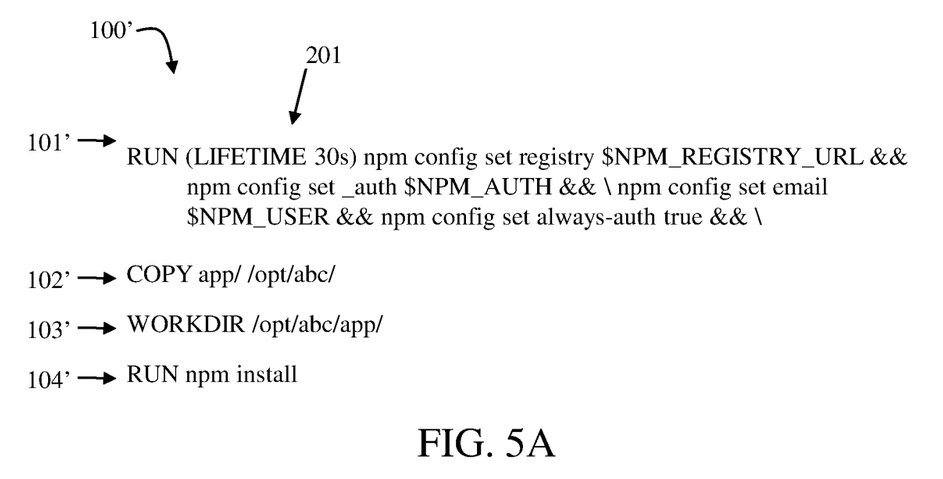
FIGS. 5A, 5B, and 6 show examples of build files in accordance with aspects of the invention.

FIG. 5A depicts an exemplary build file 100' in accordance with aspects of the invention. The build file 100' of FIG. 5A corresponds to the build file 100 of FIG. 4, but with the new syntax 201 that defines the first command 101' as being temporal based on a user-defined amount of time. As previously described, the sensitive information used by the first command 101 of the build file 100 of FIG. 4 is no longer needed after the fourth command 104 is executed. In accordance with aspects of the invention, the build engine is modified to accept the new syntax 201 that defines an amount of time that the layer exists before being deleted from the image. In this example, the new syntax 201 ("LIFETIME 30s") defines that the layer associated with the first command 101' exists for 30 seconds, and then is automatically deleted from the image prior to the image being saved to the registry 75. The amount of time is not limited to 30 seconds and instead may be defined by a user via the client program module 65. In this manner, the sensitive information used by the first command 101' is included in a temporary layer to access a target file system (e.g., the internal npm registry) to copy application code to the image, and the build engine automatically deletes the temporary layer from the image after the user defined time (e.g., 30 seconds in this example).

Figure 5B:
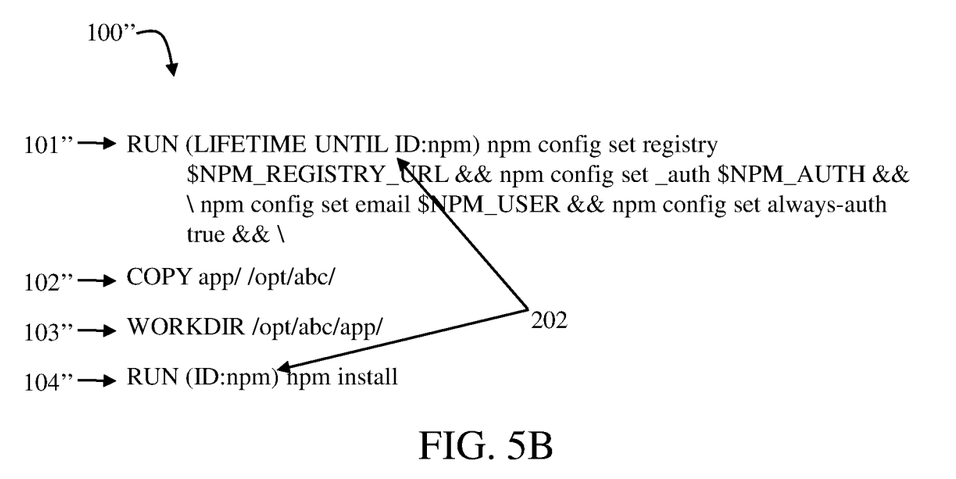

FIG. 5B depicts an exemplary build file 100" in accordance with aspects of the invention. The build file 100" of FIG. 5B corresponds to the build file 100 of FIG. 4, but with the new syntax 202 that defines the first command 101" as being temporal based on occurrence of a subsequent command. In accordance with aspects of the invention, the build engine is modified to accept the new syntax 202 that defines a subsequent command that triggers automatic deletion of the layer from the image. In this example, the new syntax 202 ("LIFETIME UNTIL ID:npm" in the first command 101" and "ID:npm" in the fourth command 104") defines that the layer associated with the first command 101" exists temporarily and then is automatically deleted from the image when the fourth command 104" is executed. In this manner, the sensitive information used by the first command 101" is included in a temporary layer to access a target file system (e.g., the internal npm registry) to copy application code to the image, and the build engine automatically deletes the temporary layer from the image upon the occurrence of the user defined command (e.g., the fourth command 104" in this example). In this manner, the sensitive information used by the first command 101" is automatically deleted from the image prior to the image being saved to the registry 75, such that the sensitive information is not visible to other users who access the image from the registry 75.

Aspects of the invention thus address the technical problem of exposing sensitive information in images stored in a registry with the technical solution of modifying the software container system host to recognize new syntax that defines a layer as temporal and to automatically omit the temporal layer from the image prior to pushing the final image to the registry. Implementations of the invention also reduce the image size compared to conventional software container systems. In particular, by omitting one or more temporary layers prior to pushing the final image to the registry, the size of the final image is reduced compared to systems that do not utilize temporary layers. In this manner, implementations of the invention reduce the amount of system resources (e.g., storage space) that are needed to handle published images, which translates to an improvement in the operation of the computer system.

Figure 6:
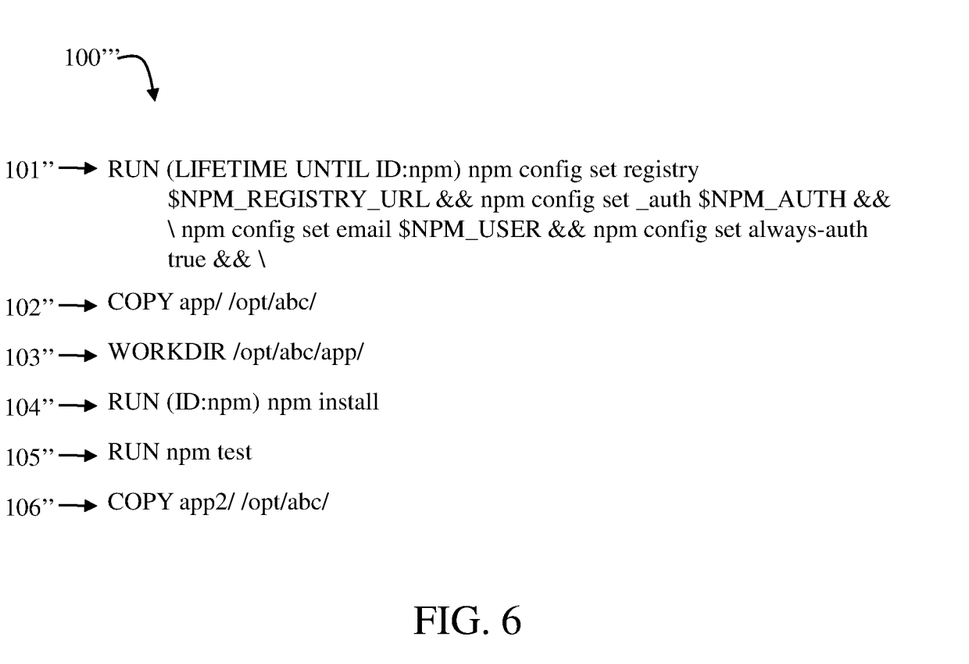

FIG. 6 depicts an exemplary build file 100''' in accordance with aspects of the invention. The build file 100''' of FIG. 6 corresponds to the build file 100" of FIG. 5B, but with additional commands 105" and 106". In operation, the first command 101" causes the build engine to create a configuration file including the sensitive information (e.g., a URL and a username and password used to access the URL). The second command 102" causes the build engine to copy application code from the URL to the image. The third command 103" causes the build engine to switch workspace. The fourth command 104" causes the build engine to install the application. The fifth command 105" causes the build engine to test the application. And the sixth command 106" causes the build engine to copy another application code (e.g., that of "app2") to the image.

In this exemplary use case, each of the commands 101" through 106" causes the build engine to create a layer with the layered file system. According to aspects of the invention, the layer associated with the first command 101" is temporary and is deleted from the layered file system based on the occurrence of the fourth command 104". An exemplary implementation for deleting the temporary layer includes the ordered steps of: (1) take a snapshot of the layered file system prior to the first command 101"; (2) perform the first command 101" to create the configuration file; (3) run a diff command to determine the difference between the first new layer created (by the first command 101") and the previous layer of the layered file system; (4) perform commands 102" through 104"; (5) after performing the fourth command 104" undo the configuration file creation by reversing the diff saved in step (3) as seen in the associated ID tag; (6) squash the layers from steps (1) to step (4) including the reversal/deletion of the configuration file; (7) perform commands 105" and 106". After performing steps (1) through (7), the resultant image has three layers including: a first layer from commands 101" through 104" squashed and without the configuration file, a second layer from command 105", and a third layer from command 106". Notably, the first layer does not include the configuration file that was created by the first command 101" because reversing the diff in step (4) removes the configuration file.

In addition to deleting the sensitive information that is included in the temporary layer associated with the first command 101", this exemplary implementation has the additional advantage of re-using layers for improved performance of retrieving images if the contents of app2 change after the image is built. A conventional squash of all six layers has the disadvantage of losing the benefits of the layered file system, meaning that one would need to re-build/pull all the layers to update the image if the contents of app2 changed. Moreover, a conventional squash of all six layers would not delete the sensitive information—instead it would be contained in the single squashed layer. In contrast to conventionally squashing all six layers, aspects of the invention delete the temporary layer that includes the sensitive information, squash a subset of the layers, and maintain the integrity of layers associated with another application (e.g., app2) that is expected to change in the future. In this manner, implementations of the invention delete the sensitive information from the final image, and also facilitate updating the image (e.g., to capture a change to app2) by building/pulling only the layers associated with the application being updated.

The described implementation for deleting the temporary layer using a diff command is but one example, and other techniques may be used in embodiments. For example, an alternative implementation involves creating a temporary file system to the side that does not get included in the final image. This alternative implementation may include the ordered steps of: (1) take a snapshot of the layered file system prior to a command including the "LIFETIME UNTIL" syntax; (2) create a fork based on determining the "LIFETIME UNTIL" syntax is included in the next command, wherein layers are built on the fork but only those layers that persist are applied to the main; (3) perform the first command 101" to create the configuration file on the fork but not on the main; (4) perform the second command 102" to copy the application code to the image, wherein this step is performed on the fork and the difference between the previous layer on the fork and this new layer is created on main; (5) perform commands 102" through 104"; (6) after performing the fourth command 104" delete the fork and continue working directly on the main; (7) perform commands 105" and 106". In this alternative implementation, the temporal layer is included in a fork image but not the main image. The sensitive information in the temporal layer is used to create another layer in the main image.

Figure 7:
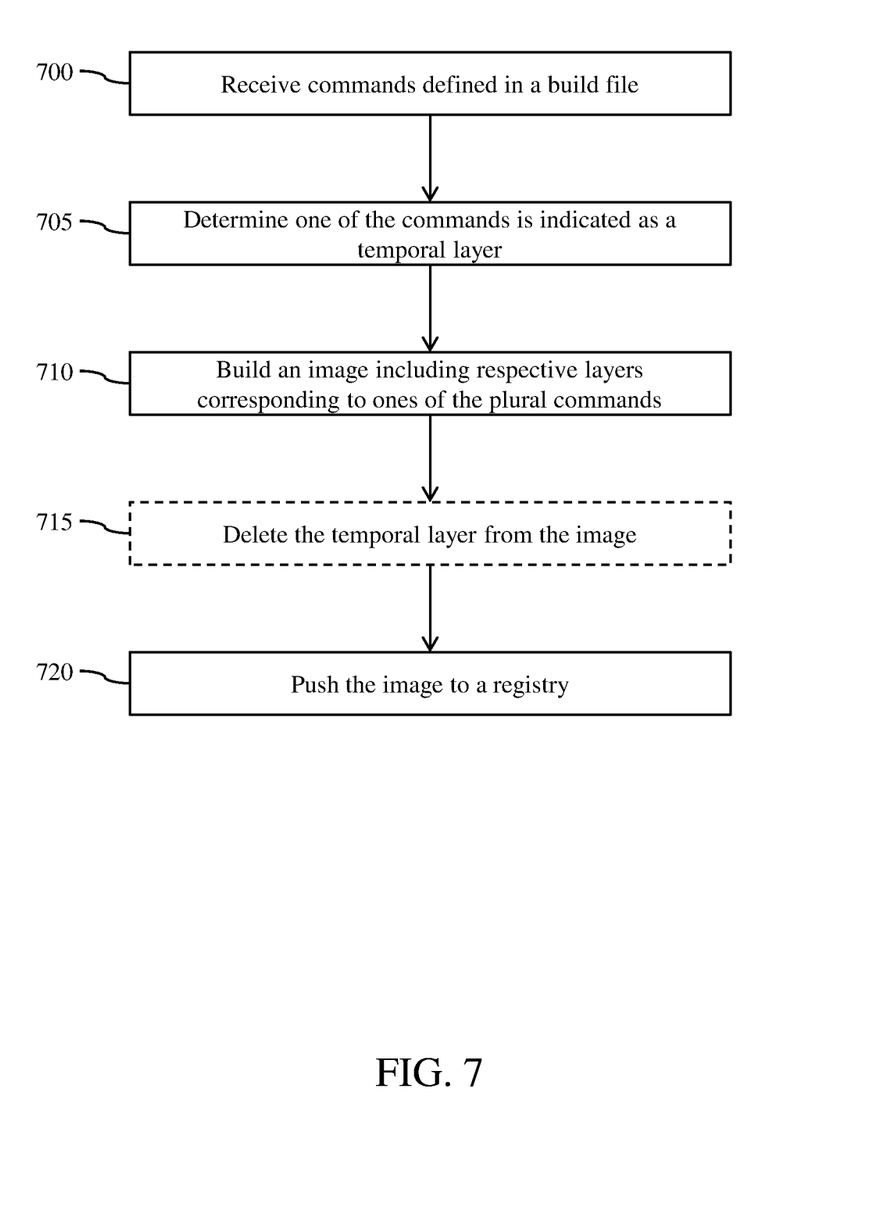
FIG. 7 shows a flowchart of steps of an exemplary method in accordance with aspects of the invention.

FIG. 7 shows a flowchart of a method in accordance with aspects of the invention. Steps of the method of FIG. 7 may be performed in the environment and examples illustrated in FIGS. 2-6, and are described with reference to elements shown in FIGS. 2-6.

At step 700, a system receives commands defined in a build file. In embodiments, as described with respect to FIG. 2, a host computer device (e.g., host 55) may receive an entire build file, or a series of commands of a build file, from a client computer device (e.g., client 50a). In one example, the build file may comprise a Dockerfile, although other types of build files used with other software container systems may be used.

At step 705, the system determines one of the commands in the build file (from step 700) is indicated as a temporal layer. In embodiments, as described with respect to FIG. 2, a build engine of the host computer device is configured to recognize syntax in a command of the build file that identifies the command as being associated with a temporal layer. The syntax may comprise, for example, a user-defined numerical amount of time that the temporal layer exists, e.g., as depicted in FIG. 5A. The syntax may comprise, for example, a subsequent one of the plural commands that triggers deleting the temporal layer, e.g., as depicted in FIG. 5B.

At step 710, the system builds an image including respective layers corresponding to respective ones of the plural commands in the build file. In embodiments, as described with respect to FIG. 2, the build engine creates a layer for each command included in the build file. In embodiments, one of the layers is the temporal layer associated with the command determined at step 705, and the build engine uses sensitive information included in this temporal layer to create at least one other one of the respective layers of the image. In a particular exemplary embodiment, the sensitive information includes a URL and a username and a password used to access the URL, and the build engine uses the URL, the username, and the password to copy application code into another one of the respective layers.

Optionally, at step 715, the system deletes the temporal layer from the image. In embodiments, as described with respect to FIG. 2, the build engine deletes the temporal layer from the image prior to pushing the image to a registry (e.g., registry 75). Step 715 may be performed during the performance of step 710. For example, as described with respect to FIG. 6, the build engine may perform the ordered steps of: create the temporal layer, use the temporal layer to create one or more other layers, delete the temporal layer, and create subsequent layers. The deletion at step 715 may be omitted in implementations that utilize a fork image and a main image, as described herein, since the temporal layer is not included in the main image is the first place.

At step 720, the system pushes the image to a registry. In embodiments, as described with respect to FIG. 2, the build engine pushes the image created using the build file to a registry (e.g., registry 75), wherein the image that is pushed to the registry does not contain the temporal layer determined at step 705. In this manner, the sensitive information included in the temporal layer may be used to create other layers but is not included in the final image that is pushed to the registry.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method of performing steps described herein. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, at a host computer, plural commands defined in a build file;
determining, by the host computer, one of the plural commands is indicated as a temporal layer;
building, by the host computer, an image including respective layers corresponding to respective ones of the plural commands;
deleting from the image, by the host computer, one of the respective layers corresponding to the one of the plural commands indicated as the temporal layer; and
pushing, by the host computer, the image to a registry.

2. The method of claim 1, wherein the image defines a software container including application code to be run on a computer device other than the host computer.

3. The method of claim 2, wherein the container is instantiated when the image is run, and the container is used to run the application code on the computer device in an isolated process of the operating system of the computer device.

4. The method of claim 1, wherein the temporal layer includes sensitive information.

5. The method of claim 4, further comprising using the sensitive information to create another one of the respective layers.

6. The method of claim 4, wherein the sensitive information includes: a URL;
and a username and a password used to access the URL.

7. The method of claim 6, further comprising using the URL, the username, and the password to copy application code into another one of the respective layers.

8. The method of claim 1, wherein the determining the one of the plural commands is indicated as the temporal layer comprises recognizing syntax in the one of the plural commands.

9. The method of claim 8, wherein the syntax defines a numerical amount of time that the temporal layer exists.

10. The method of claim 8, wherein the syntax defines a subsequent one of the plural commands that triggers the deleting.

11. A computer program product comprising a computer readable storage medium having program instructions embodied therewith, the program instructions executable by a host computing device to cause the host computing device to:
   receive, from a client computing device, plural commands defined in a build file;
   recognize syntax in one of the plural commands defining the one of the plural commands as a temporal layer;
   build an image including respective layers corresponding to respective ones of the plural commands, wherein at least one of the layers is created using sensitive information contained in the temporal layer; and
   push the image to a registry, wherein the image is devoid of the temporal layer when the image is pushed to the registry.

12. The computer program product of claim 11, wherein:
   the image defines a container including application code to be run on a computer device other than the host computing device;
   the container is instantiated when the image is run; and
   the container is used to run the application code on the computer device in an isolated process of the operating system of the computer device.

13. The computer program product of claim 11, wherein:
   the sensitive information includes: a URL; and a username and a password used to access the URL; and
   the program instruction cause the host computing device to use the URL, the username, and the password to copy application code into another one of the respective layers.

14. The computer program product of claim 11, wherein the syntax defines a numerical amount of time that the temporal layer exists.

15. The computer program product of claim 11, wherein the syntax defines a subsequent one of the plural commands that triggers deleting the temporal layer from the image prior to pushing the image to the registry.

16. A system for building images used in software containers, comprising:
   a CPU, a computer readable memory and a computer readable storage medium associated with a computing device;
   program instructions to receive, from a client computing device, plural commands defined in a build file;
   program instructions to recognize syntax in one of the plural commands defining the one of the plural commands as a temporal layer;
   program instructions to build an image including respective layers corresponding to respective ones of the plural commands, wherein at least one of the layers is created using sensitive information contained in the temporal layer; and
   program instructions to delete the temporal layer from the image prior to pushing the image to a registry,
   wherein the program instructions are stored on the computer readable storage medium for execution by the CPU via the computer readable memory.

17. The system of claim 16, wherein:
   the image defines a container including application code to be run on a computer device other than the host computing device;
   the container is instantiated when the image is run; and
   the container is used to run the application code on the computer device in an isolated process of the operating system of the computer device.

18. The system of claim 16, wherein:
   the sensitive information includes: a URL; and a username and a password used to access the URL; and
   the program instruction cause the host computing device to use the URL, the username, and the password to copy application code into another one of the respective layers.

19. The system of claim 16, wherein the syntax defines a numerical amount of time that the temporal layer exists.

20. The system of claim 16, wherein the syntax defines a subsequent one of the plural commands that triggers the deleting.

* * * * *